Aug. 6, 1940.　　　G. HOLST ET AL　　　2,209,971
SOUND RECORD
Original Filed Feb. 13, 1937
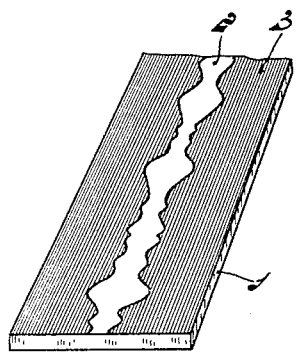
INVENTORS
GILLES HOLST and
JAN HENDRIK DE BOER
BY
ATTORNEY Patented Aug. 6, 1940

2,209,971

UNITED STATES PATENT OFFICE 2,209,971

SOUND RECORD

Gilles Holst and Jan Hendrik de Boer, Eindhoven, Netherlands, assignors, by mesne assignments, to Hartford National Bank and Trust Company, trustee, Hartford, Conn.

Original application February 13, 1937, Serial No. 125,653, now Patent No. 2,150,834, dated March 14, 1939. Divided and this application January 4, 1939, Serial No. 249,302. In Germany February 17, 1936

4 Claims. (Cl. 274—41.6)

The present invention, which is a division of our copending application Ser. No. 125,653, filed February 13, 1937, now Patent No. 2,150,834, granted March 14, 1939, relates to optically-reproducible sound-records, particularly sound-films comprising a thin transparent support sensitized with a diazonium compound.

Although films with which the images are produced by forming an azo dyestuff, surpass the usual photographic films employing silver halogenides as light-sensitive material, in that they are "grainless," we have found that they are often unsatisfactory for sound reproduction, because the sound intensity is too low. More particularly, we have found that although azo dyestuff images produce sufficient contrast in the visible portion of the spectrum, they produce insufficient contrast in the infra-red portion, i. e. they insufficiently absorb light in the infra-red region.

While it would be possible to select a definite combination of a diazonium compound and a coupling component which would form an azo dyestuff having an absorption band in the infra-red region, such a procedure has several disadvantages. More particularly, either one of the coloring matter components at the non-colored parts of the support would absorb also infra-red light, or the light-decomposition product of the diazonium compound—which product is also present on the portions of the film uncolored for the visible light—would absorb considerable infra-red light, thereby resulting in insufficient contrast.

The above difficulties are very pronounced in the reproduction because the photo-electric cells usually employed are very sensitive in the infra-red region of the spectrum, and because the light sources used have an intensive radiation in this region.

The object of our invention is to overcome the above-mentioned difficulties of optically-reproducible sound records sensitized with diazonium compounds.

In accordance with the invention, we provide a sound record comprising a support of transparent material within which are photographically formed metal image portions.

More particularly, instead of converting the diazonium compound into an azo dyestuff, we produce a metal image, for instance by bringing a metal salt into a reactive relationship with the light-decomposition product of the diazonium compound in a manner known per se to form a metal image.

In order that the invention may be clearly understood and readily carried into effect, we shall describe the same more fully with reference to the accompanying drawing, in which the single figure is a sectionized perspective view of a sound film according to the invention.

The positive sound film shown by way of example in the drawing comprises a thin support 1 of transparent material, for instance regenerated cellulose having a thickness of less than 0.06 mm., and carrying a sound track 2 bounded by an opaque or image portion 3.

In accordance with the invention the support 1 is originally provided with a diazonium compound and the metal image portion 3 is formed by bringing a metal salt into reactive relationship with the light-decomposition product of the diazonium compound. The metal salt, similarly to the diazonium compound, may be incorporated within support 1, prior to the recording operation, or the metal salt may be applied after the exposure. The metal salt may be, for example, a silver salt in which case the photographically-formed image portion 3 would comprise silver.

The absorption of the metal image 3 for light in the visible part of the spectrum, is of the same order of magnitude as that of an azo dyestuff image, but its absorption for light in the infra-red portion of the spectrum is very much higher than that of the azo dyestuff image. Thus, it is of great advantage to use the metal images according to the invention in grainless transparent film for sound recording.

Particularly sharp contrasts can be obtained by using a mercurous salt. When using a mercurous salt, we prefer to use together therewith a salt of a metal which lies above mercury in the electro-chemical series, for example silver, gold and platinum, whereby images produced are much more stable than those produced solely by a mercurous salt and a diazonium compound. In this case the resulting image portion 3 would comprise a metal which lies higher in the potential series of metals than does mercury, for instance gold, silver or platinum. The production of such metal images has been set forth in detail in U. S. Patent 2,067,690, filed January 11, 1935, to Alink et al.

As has been stated, films having a metal image according to the present invention are particularly suitable for reproduction with photo-electric cells, for instance cells having a caesium-caesium oxide cathode, as such cells are very sensitive in the infra-red region, and the light sources used in conjunction with such cells have an intensive radiation of light in the infra-red region. In addition to having advantages in direct reproduction, the films of the invention are also of advantage in making copies.

While we have described our invention in connection with specific examples and applications, we do not wish to be limited thereto, but desire the appended claims to be construed as broadly as is permissible in view of the prior art.

What we claim is:

1. An optically-reproducible grainless sound-record comprising a support of transparent material, and a sound-record having photographically-produced metal image portions lying both within and on said support.

2. An optically-reproducible grainless sound-record comprising a support of regenerated cellulose having a thickness less than 0.06 mm., and a sound-record having photographically-produced metal image portions lying both within and on said support.

3. An optically-reproducible grainless sound-record comprising a support of transparent material, and a sound-record having photographically-formed portions lying both within and on said support and comprising mercury.

4. An optically-reproducible grainless sound-record comprising a support of transparent material and a sound-record having a photographically-formed metallic image portion lying both within and on said support, said portion comprising a metal which lies higher than mercury in the potential series of metals.

GILLES HOLST.
JAN HENDRIK DE BOER.